(12) United States Patent
Fischer

(10) Patent No.: US 10,986,806 B2
(45) Date of Patent: Apr. 27, 2021

(54) MILKING INSTALLATION, MILKING EQUIPMENT AND TEAT CUP LINER, AND ASSOCIATED OPERATING METHOD

(71) Applicant: Friedrich Fischer, Wimsheim (DE)

(72) Inventor: Friedrich Fischer, Wimsheim (DE)

( * ) Notice: Subject to any disclaimer, the term of this patent is extended or adjusted under 35 U.S.C. 154(b) by 502 days.

(21) Appl. No.: 15/763,420

(22) PCT Filed: Sep. 6, 2016

(86) PCT No.: PCT/EP2016/070998
§ 371 (c)(1),
(2) Date: Mar. 26, 2018

(87) PCT Pub. No.: WO2017/055030
PCT Pub. Date: Apr. 6, 2017

(65) Prior Publication Data
US 2018/0325071 A1    Nov. 15, 2018

(30) Foreign Application Priority Data
Sep. 28, 2015    (DE) .......................... 102015116333.0

(51) Int. Cl.
*A01J 5/16*    (2006.01)
*A01J 7/02*    (2006.01)
(Continued)

(52) U.S. Cl.
CPC ................ *A01J 5/16* (2013.01); *A01J 5/044* (2013.01); *A01J 5/08* (2013.01); *A01J 7/022* (2013.01);
(Continued)

(58) Field of Classification Search
CPC ...... A01J 5/16; A01J 5/044; A01J 5/08; A01J 7/022; A01J 7/025; A01J 9/02; A01J 9/04;
(Continued)

(56) References Cited

U.S. PATENT DOCUMENTS 5,857,424 A * 1/1999 Johnston .................. A01J 5/06
119/14.02

FOREIGN PATENT DOCUMENTS

DE        10160161 A1    6/2003
DE    102004019728 A1   11/2005
(Continued)

OTHER PUBLICATIONS

International Search Report for PCT/EP2016/070998, dated Nov. 8, 2016.

*Primary Examiner* — Kathleen I Alker
(74) *Attorney, Agent, or Firm* — Merchant & Gould P.C.

(57) ABSTRACT

Milking clusters for a milking installation have four teat cups, each teat cup having a cup housing and a teat cup liner with a top region and a suction region. A connection for a milk tube is arranged at the cup bottom or at the end of the suction region of the teat cup liner. A mouth portion of a sterile air pressure line is arranged in the top region of the teat cup liner, through which pressure line sterile air is introduced at a volumetric flow rate greater than a fluid aspiration volumetric flow rate at the milk tube, such that a sterile air blanket is established in the top region of the teat cup liner. The milking clusters with the cup liner and sterile air blanket prevent milked milk from being contaminated by contaminants and microorganisms from the shed air, extending storage life for untreated raw milk.

15 Claims, 8 Drawing Sheets

(51) Int. Cl.
*A01J 7/04* (2006.01)
*A01J 5/08* (2006.01)
*A01J 5/04* (2006.01)
*A01J 9/02* (2006.01)
*A01J 9/04* (2006.01)

(52) U.S. Cl.
CPC .................. *A01J 7/025* (2013.01); *A01J 7/04* (2013.01); *A01J 9/02* (2013.01); *A01J 9/04* (2013.01)

(58) Field of Classification Search
CPC ...... A01J 5/00; A01J 5/017; A01J 5/04; A01J 5/041; A01J 5/047; A01J 5/048; A01J 5/06; A01J 7/00; A01J 7/005; A01J 7/04
See application file for complete search history.

(56) References Cited

FOREIGN PATENT DOCUMENTS

| EP | 477950 A1 | 4/1992 |
| EP | 743818 B1 | 3/2002 |
| EP | 1795069 A2 | 6/2007 |
| EP | 2625953 A1 | 8/2013 |

\* cited by examiner

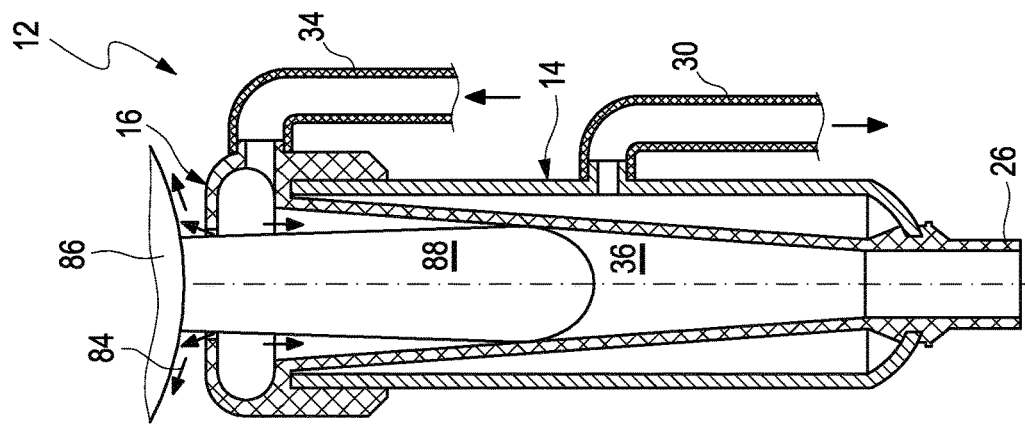
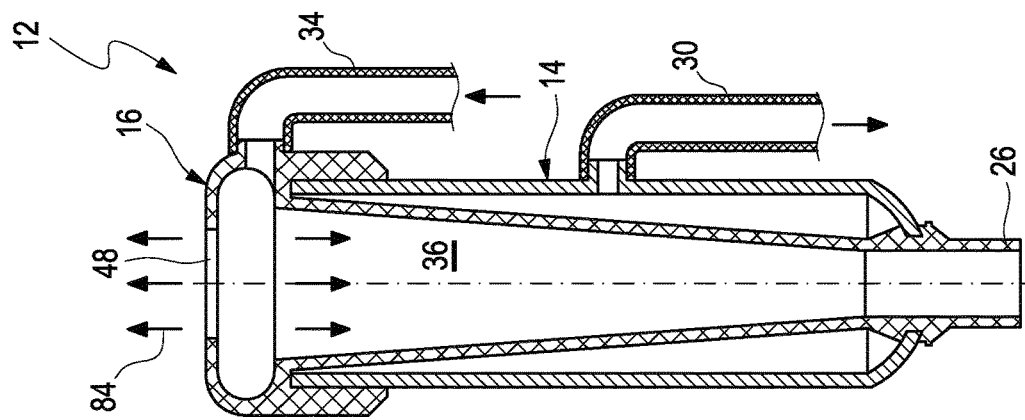
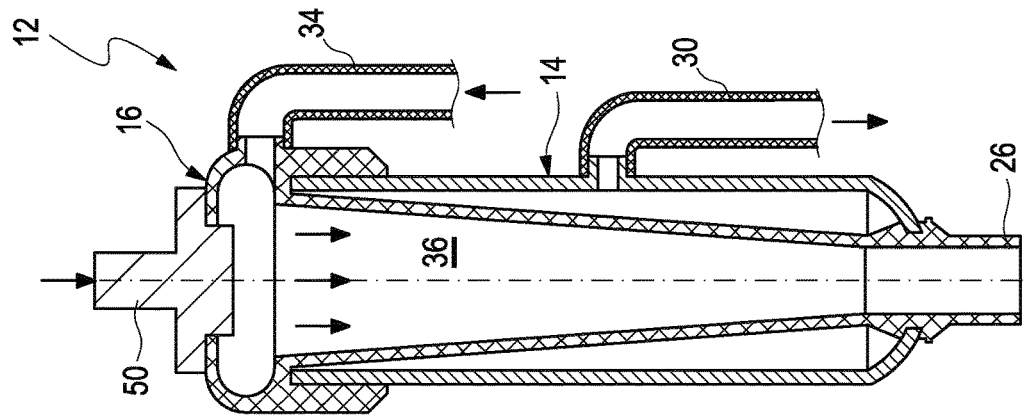
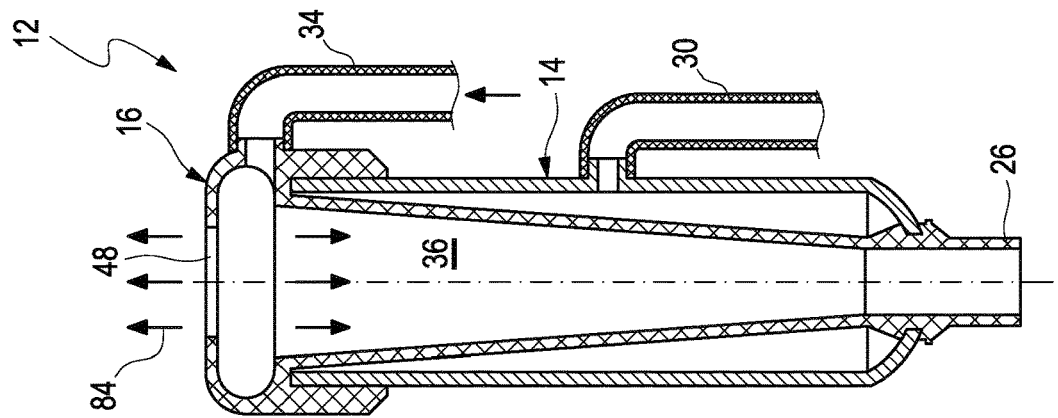

MILKING INSTALLATION, MILKING EQUIPMENT AND TEAT CUP LINER, AND ASSOCIATED OPERATING METHOD

This application is a National Stage application of PCT/EP2016/070998, filed 6 Sep. 2016, which claims priority to German Patent Application No. 102015116333.0, filed 28 Sep. 2015, the contents of all of which are hereby incorporated by reference in their entireties.

The invention relates to a milking installation for milking animals such as for example cows, goats, sheep, horses or donkeys, having a milking cluster and a teat cup liner used in the milking cluster, and to an associated operating method.

BACKGROUND OF THE INVENTION

A milking installation or milking machine is an installation or machine used on a farm for milking livestock, in particular cows, in order to obtain milk from an udder. Depending on the type of animal shed, there are stationarily installed milking installations with milking stalls or milking robots or transportable milking machines, for example transportable on two or four wheels, which are used for milking one or more animals.

A generic milking installation or milking machine comprises one, in particular a plurality of, milking clusters, which generally have two or four teat cups which accommodate the teats of the animal to be milked. Milk tubes leading to a milking cluster claw are connected to the teat cups and, from the claw, discharge the milk via a central milk tube to a milk collection tank.

Each teat cup comprises a cylindrical hollow body, usually of stainless steel or plastics, the upper end of which is open and the lower end of which has a connection point for a milk tube and optionally for a pulsator line. A teat cup liner, which folds back over the upper opening of the teat cup, is inserted in the interior of the teat cup and receives the teat to be milked. By means of the pulsator line, a reduced pressure can be generated in the space between teat cup and teat cup liner, such that vibration of the teat cup liner massages the teat and as a result milk release can be stimulated. Milk release is thus stimulated by a pulsating reduced pressure. Teat cup liners may conventionally consist of rubber or silicone.

A prior art teat cup liner is known for example from EP 477 950 A1 which can be accommodated in a teat cup and has a particularly robust connection and extended durability.

In the modern dairy industry there is a trend towards milk, which has hitherto been subjected to thermal or chemical treatment to kill microorganisms or has been treated with UV light for sterilisation purposes, being marketed in its natural state as untreated "organic" milk without any such post-treatment steps. Hygiene here plays a significant role in the length of the storage life of the raw milk product, since any ingress by microorganisms shortens storage life and may be detrimental to the quality of the final product.

In the present state of the art, shed air contaminated with microbes and microorganisms is drawn in when the teat cups are applied and when the milking clusters are removed and contaminates the sterile raw milk flowing from the udder. Conventional shed air contains dust particles of all sizes, yeasts and moulds and various viruses and bacteria which distinctly reduce the storage life of the raw milk.

Measures for reducing the contamination of raw milk by dust and organic foreign substances in the shed air are known from the prior art. DE 10 2004 019 728 A1, for instance, discloses a milking cluster which comprises an air inlet control in which an annular filter is provided, through which the air flowing through the annular filter can flow into the teat cup. However, when such a teat cup is removed, there is nothing to prevent shed air from entering the upper opening and thus pathogens and dust particles from remaining in the teat cup on insertion of the teats and contaminating the raw milk.

DE 101 60 161 A1 furthermore discloses a milking cluster and a milking method, in which cleaning agents and disinfectants can be supplied through an air connection line, wherein an air filter may be provided for purifying compressed cleaning air. However, in the case of this milking cluster and milking method too, there is nothing to prevent contaminated shed air from entering the milking cluster before the teat cup is placed on a teat and thus the raw milk from being contaminated.

EP 743 818 B1 describes a milking cluster in which an air intake line may be guided in the cup bottom or starting from the cup bottom upwards through a pulsation chamber, through which line air which has passed through a carbon filter can be guided into the teat cup in order to reduce ingress of contaminated shed air. A reduced pressure generally prevails in the teat cup which, in the upper region, can be reduced down to 5 kPa, such that leakage air flow of shed air can be reduced, but not entirely prevented. The flow volume of filtered air is lower than the volume of air drawn off by a milk suction vacuum, such that shed air can furthermore enter the teat cup. The air line guided through the pulsation chamber passes through the teat cup liner and may result in pressure sores on the udder or a teat of the animal to be milked. Furthermore, the internal diameter of the teat cup is reduced by the air line passed through the interior of the cup. In addition, teat cups must be designed for such an air feed line leading upwards from the cup bottom; retrofitting to a conventional milking cluster is not possible. It is therefore also possible in the milking cluster known from this document for a leakage air flow to flow in, and just a small quantity of bacteria or organic contaminants may result in all the raw milk in a milk collection tank being contaminated, so distinctly reducing its storage life. Furthermore, the interior of the teat cup is made smaller and milking comfort for an animal to be milked is reduced. Retrofitting to previously known teat cups is not possible.

Products, in particular cheese, are increasingly being made from untreated raw milk and there is furthermore great consumer interest in organic milk without artificial preservatives or treatment steps for extending storage life. Bringing about a natural improvement in storage life by preventing contamination of the milk means that farmers can change over to direct selling and thus achieve higher milk prices in order to be able to make greater economic returns over the long term. Complex and energy-intensive post-treatment steps can be omitted.

The object of the invention is to propose a milking installation, a milking cluster, an associated teat cup liner and a milking method which permits a great improvement in the storage life of raw milk without complex post-treatment steps and thus provides a high-quality, natural food product, wherein the above-stated disadvantages of the prior art are overcome.

Said object is achieved by a milking cluster, a milking installation, a teat cup liner and a milking method according to the independent claims. Advantageous embodiments of the invention constitute the subject matter of the subclaims.

SUMMARY OF THE INVENTION

According to the invention, a milking cluster is proposed which comprises at least one, in particular two or four, teat cups, wherein each teat cup has a cup housing and, accommodated in the cup housing, a teat cup liner with a top region and a suction region. A connection for a milk tube is arranged at the cup bottom or at the end of the suction region of the teat cup liner. A connection for a pulsator line for stimulating a milking process is preferably arranged on a wall or bottom portion of the cup housing.

It is proposed that a mouth portion of a sterile air pressure line is arranged in the top region of the teat cup liner, through which pressure line the sterile air can be introduced at a volumetric flow rate greater than a fluid aspiration volumetric flow rate at the milk tube, such that a sterile air blanket is established in the top region of the teat cup liner.

In other words, a milking cluster is proposed, wherein each teat cup of the milking cluster comprises a teat cup liner and at the top region of the teat cup liner a sterile air pressure line ends in a mouth portion. Sterile air, i.e. air with a high degree of purity, from which dust particles and biological contaminants, in particular bacteria and viruses, have been filtered out, is blown in through the sterile air pressure line at an overpressure above atmospheric and above a reduced pressure prevailing in the teat cup during use into the top region of the teat cup liner, in such a manner that shed air is prevented from getting into the interior of the teat cup. It is advantageous that the sterile air pressure line is fitted onto the outside of the teat cup and ends in the top region of the teat cup liner, such that for example existing teat cups can be retrofitted with teat cup liners according to the invention, and existing milking clusters can be retrofitted at low cost. There are no structural changes to the interior of the teat cup, such that the teat can be accommodated without obstruction in the interior of the cup and be milked by the pulsation.

It is an essential feature of the invention that an aspiration fluid volumetric flow rate, which prevails at the milk tube in order to aspirate milked milk, is smaller than a supplied volumetric flow rate of sterile air which is introduced via the top region of the teat cup liner. The interior of the teat cup is thus constantly filled with an overpressure of sterile air, such that no contaminants can enter via the shed air, this being denoted a sterile air blanket. Since the sterile air is introduced in the top region of the teat cup liner, the suction region of the teat cup liner is sealed off from the top region by the teat on insertion of the teat into the teat cup. During the milking process, the sterile air continues to be blown in at the top region or forms a slight overpressure there or escapes by suitable means, whereas a reduced pressure prevails in the bottom portion of the cup housing so that outflowing milked milk can be discharged to a milk collection tank. The milk does not come into contact with shed air at any point during the milking process, but instead only with sterile air, wherein the milk flowing out from the udder remains biologically untreated and hygienically sterile.

Using the milking cluster according to the invention yields a virtually sterile raw milk which has a longer storage life and can thus be stored over a distinctly extended period without further treatment. As a consequence, for example cheese, kefir or other dairy products and raw milk can be stored over an extended period, and the overall processing can be carried out less energy intensively and with fewer working steps, wherein for example extended maturation processes can be achieved, and a natural and untreated product can be provided.

In general, a reduced pressure of approx. 25 kPa relative to atmospheric air pressure of generally 1,013 hPa prevails in the lower region of a teat cup. If a teat is accommodated in the teat cup, a reduced pressure of approx. 40 kPa to 80 kPa may be established in the lower region. In the absence of a sterile air blanket, a reduced pressure of generally 10 kPa to 30 kPa prevails at the upper teat cup. A volumetric flow of sterile air must thus be introduced into the top region of the teat cup which achieves an overpressure of at least 20 kPa to 40 kPa, up to 60 kPa, in order to ensure a sterile air blanket.

A sterile air blanket means in this case, that an overpressure of sterile air prevails in the opening region of the teat cup, such that contaminated shed air cannot enter the interior of the teat cup. As a result, it is ensured that, both when removing the milking cluster and when placing the milking cluster, no contaminant microorganisms or dust particles can get into the teat cup and so contaminate the raw milk.

In one advantageous further development of the milking cluster, an annular teat accommodation region with a teat accommodation opening can be provided as an annular chamber in the top region of the teat cup liner, and the mouth portion can be arranged on a wall region of the annular chamber. An annular chamber means that, even when a teat is accommodated, an annular volume through which air flows and in which the sterile air overpressure prevails is still present in the top region of the teat cup liner around the accommodated teat and prevents ingress of foreign substances. The teat accommodation region furthermore facilitates teat accommodation, since the annular configuration defines a teat accommodation lip for the teat cup liner in which the teat can readily be accommodated and comfortably guided. The overpressure in the annular chamber can be established by the sterile air pressure line, wherein the mouth portion can blow air into the annular chamber either at an individual point or at a plurality of points uniformly distributed around the circumference of the annular chamber.

In one advantageous further development, the suction region of the teat cup liner may at least in regions taper conically starting from the top region and towards the milk tube connection. Because the suction region of the teat cup liner tapers conically towards the milk tube connection, on insertion of a teat the milk tube connection portion of the suction region is separated in airtight manner from the upper top region. As a consequence, an overpressure of sterile air can continue to prevail in the upper top region, while in the lower suction region a reduced pressure in the milk tube generated by a milk delivery pump can be established in order to convey milk into a milk collection tank. As a result of the conical shape of the teat cup liner, a separation is established on insertion of the teat between the sterile air overpressure region and the milking reduced pressure region in the teat cup, such that an elevated delivery capacity can be achieved at the same time as a hermetic sterile air blanket.

In one advantageous further development, the mouth portion of the teat cup liner may comprise a nozzle for oriented sterile air guidance towards a teat accommodation opening. The nozzle may be designed such that it directs the sterile air flow, which flows into the top end of the teat cup liner, in oriented manner towards the teat accommodation opening of the teat cup liner and, in so doing, fans it out in such a manner that a sterile air blanket covering the entire teat accommodation opening can be achieved. Ingress of contamination into the teat cup can be effectively prevented as a consequence.

It is advantageously proposed to guide the sterile air pressure line on an outer wall portion of the cup housing and fasten it thereto or to integrate it in the outer wall portion. Simplified handling of the milking cluster when placing the teat cup onto a teat can be achieved by fastening the sterile air pressure line to the outer wall portion of the cup housing.

In this manner, it is ensured that the sterile air pressure line is guided parallel to the milk tube line or pulsator line, so allowing a simplified milking process to be achieved. The lines of the teat cup thus lead away from the cup bottom to the milking cluster claw. The sterile air pressure line can be adhesively bonded, clamped, screwed or fastened with overlay means to an outer wall portion of the teat cup and can advantageously be fastened to the milk tube or a pulsator line in the lower region of the cup bottom, such that the milking cluster is easy to handle. As a result, handling of the milking cluster, insertion of the teats and removal of the milking cluster can be speeded up.

Advantageously, a sterile air distributor unit with a central sterile air pressure line connection can be arranged on a milking cluster claw, from which a sterile air pressure line branches off to each teat cup. A milking cluster conventionally comprises a claw, from which the individual milk tubes of the teat cup branch out and in which for example a distributor unit is also provided for the pulsator lines. It is advantageously proposed that a sterile air distributor unit can be arranged on the claw, into which distributor unit a central sterile air pressure line connection opens, with which sterile air can be supplied at high pressure. From here, the sterile air distribution units branch out to the individual teat cups, it advantageously being possible to provide pressure control in the central sterile air pressure line connection, in particular differential pressure control can be provided between the central milk tube connection and sterile air pressure distributor in order to be able to ensure a reliable sterile air blanket in the mouth region of the teat cups. The milk tube and sterile air pressure line can thus be guided in parallel to each teat cup.

The invention likewise independently proposes a teat cup liner comprising a top region and a suction region for use in an above-stated milking cluster. A mouth portion for a sterile air pressure line is arranged at the top region of the teat cup liner, wherein the top region preferably comprises an annular teat accommodation region as an annular chamber, on the wall of which is arranged the mouth portion. The suction region furthermore preferably tapers conically at least in portions starting from the top region towards the milk tube connection. A teat cup liner which can be accommodated in a teat cup of the milking cluster is thus proposed to fit with the above-stated milking cluster. A mouth portion for a sterile air pressure line is provided in a top region of the teat cup liner, though which mouth portion the sterile air can be introduced at a volumetric flow rate which is higher than the volumetric flow rate which is aspirated by the milk connection line. An overpressure of sterile air is consequently established in the teat cup, such that contaminated shed air cannot enter. The teat cup liner may in particular be used for retrofitting existing milking clusters, wherein a sterile air compressed air line merely needs to be fitted to the teat cups and connected in the top region of the teat cup liners. As a consequence, existing milking clusters can be retrofitted in inventive manner or, in the event of a defect in a teat cup liner, the latter can be replaced.

In one advantageous further development, the teat cup liner may comprise a pressure relief valve in the wall portion of the annular chamber or the teat accommodation opening may comprise a surrounding wall portion of the annular chamber which has a resilience such that, when a teat is inserted, a pressure relief valve function can be provided. Alternatively or additionally, a radius of the teat accommodation opening of the teat cup liner may be larger than an average teat radius of an animal to be milked. On insertion of a teat into the teat cup liner, the teat conventionally seals the top region relative to the milk aspiration region in the teat cup, such that a vacuum prevails in the lower region by which the milked milk can be aspirated and in the upper top region an overpressure prevails due to the introduction of sterile air. In order in particular to improve comfort for the livestock and prevent unintentional detachment of the teat cup from the teat, a pressure valve may be provided which can dissipate any overpressure of sterile air which may build up in the top region. Furthermore or alternatively, the wall portion which bounds the teat accommodation opening may be made from a more highly resilient material such that, in the event of overpressure, the flexibility of the bounding portion allows sterile air to escape. Finally, the accommodation region of the teat accommodation opening may also have a radius which is larger than an average teat radius of the livestock, such that during the milking process sterile air can escape in the transitional region between udder and teat and so prevent ingress of shed air while no unpleasant overpressure is built up in the top region of the teat cup. This improves the comfort and handling of the milking cluster and prevents the teat cup from falling off unintentionally during the milking process.

A further independent aspect proposes a milking installation which comprises at least one milking cluster according to one of the preceding exemplary embodiments. At least one central sterile air pressure line includes at least one sterile air filter installation, through which each sterile air pressure line of the milking cluster is centrally supplied with sterile air, wherein a sterile air volumetric flow rate can be established in each sterile air pressure line which is higher than a fluid aspiration volumetric flow rate in each milk tube, such that a sterile air blanket is established in each teat cup of the milking cluster. The milking installation may comprise an individual milking cluster or a plurality of milking clusters in adjacent milking stalls, wherein a central sterile air filter installation is provided or an individual milking air filter installation is associated with each individual milking cluster, or with a group of milking clusters, through which sterile air is conveyed into a pressure line at the top region of the teat cup in order to prevent ingress of shed air into the teat cup. It is here essential for the volumetric flow rate of the sterile air which is conveyed by the sterile air pressure line into the top region of the teat cup to be higher than a fluid aspiration volumetric flow rate of a milk tube which discharges the milk from the teat cup, such that during a changeover period, during which no milking process proceeds, a sterile air blanket is established in the teat cup, such that no contaminants can enter.

Generic milking installations comprise a central milk line by which the milk is discharged from the teat cup and a central pulsator line by which a reduced pressure for massaging the teats can be generated. Such a milking installation can have a central sterile air pressure line added in order to be able to provide the sterile air blanket.

It is conceivable for a differential pressure means to be provided which is capable of monitoring a differential pressure between the central milk line and central sterile air pressure line or between the central milk tube connection and central sterile air pressure line connection of each milking cluster in order to control a sterile air supply into the sterile air central pressure line or to the central sterile air pressure line connection in such a manner that a continuous sterile air blanket is ensured.

The sterile air filter installation may advantageously comprise an EPA/HEPA or a UPA filter unit with a filter of class H13, preferably H14, or class 100 or higher, wherein the sterile filter installation preferably comprises a controllable sterile air compressor unit. Airborne suspended particulate matter filters which are particularly highly suitable for carrying out the invention are "HEPA" (high-efficiency particulate arrestance) filters or "ULPA" (ultra-low penetration air) filters. Filters of these classes are used for filtering out viruses, inhalable dusts, mite eggs or excreta, pollen, smoke particles, asbestos, bacteria, various toxic dusts or aerosols from the air. These filters are conventionally used in medical technology and may suitably be used according to the invention for producing sterile air, wherein ambient air is forced by means of blowers or compressor means through the filters and the airborne suspended particulate matter and contaminants present therein can be filtered out Filters of class H13 or higher achieve a separation rate of 99.95% for the entire air flow, wherein a separation rate of at least 99.75% for particles from 0.1 µm to 0.3 µm can be achieved locally. According to German Mechanical Engineering Industry Association recommendation VDMA 15390 "Compressed air quality" (list of recommended purity classes according to ISO 8573-1), March 2004, the filters used for producing sterile air for a sterile air blanket are those which completely remove solid contaminants in the range from 1 µm to 5 µm and only permit the passage of 1-100 ppm of contaminants <1 µm. Such filters ensure the sterility necessary for a sterile air blanket, such that raw milk has an extremely long life without additional treatment steps.

A sterile air atmosphere is furthermore advantageously used in the subsequent raw milk processing, such that sterility is maintained. It is furthermore advantageous to this end that no unfiltered air comes into contact with the raw milk at any point in the milking installation. The pressure in the central sterile air line can be established by a controllable sterile air compressor unit and in particular established in a ratio to the volumetric flow rate of the fluid aspiration milk tube in such a manner that the sterile air blanket is maintained throughout the working process. In this respect, the sterile air blanket must be maintained virtually continuously without interruption during extraction, transport and processing.

The sterile air volumetric flow rate may advantageously be established such that an atmospheric overpressure of sterile air of at least 5 kPa, in particular of at least 10 kPa, is established in the annular chamber of the teat cup in order to produce the sterile air blanket. An overpressure of at least 5 kPa, in particular 10 kPa or greater, in the opening region of the teat cup effectively prevents microorganisms from the shed air from being able to enter and shorten the storage life of the raw milk.

The milking installation advantageously comprises a central milk collection line to which the milk tube of each milking cluster is connected. The central collection line collects the milked raw milk from each milking cluster and conveys it for further processing to a collection tank or to a transporter. The central collection line may advantageously be guided through a continuous-flow milk chiller, wherein the raw milk is chilled to <5° C. This ensures that even small quantities of biological contaminants cannot propagate any further in the raw milk and the storage life of the raw milk can thus be further extended. Suitable continuous-flow milk chillers are a heat exchanger using ice water as cold reservoir or a conventional compression continuous-flow chiller.

One advantageous further development of the milking installation proposes that a milk collection tank is included, the air-equalising opening of which is connected to a sterile air filter installation or the sterile air pressure line of the milking installation. Not only for cleaning purposes but also for generating a low-temperature atmosphere, a milk collection tank must comprise pressure equalisation means with ambient air, through which air can flow back in, for example during chilling of the milk collection tank, or flow out during heating, in particular during hot cleaning of the milk collection tank. This air pressure equalisation opening is advantageously connected to a sterile air filter installation, such that only sterile air can flow into the milk collection tank. There are no further openings to the atmosphere, such that it is ensured that no contaminated air can be brought into contact with the raw milk. The milk collection tank may preferably comprise a milk chiller which chills the raw milk to <5° C., such that a cold chain and an extended storage life may be achieved more rapidly. For instance, the raw milk may be chilled by direct evaporation of coolant or ice water or the raw milk may be chilled to low temperatures by blowing in chilled sterile air.

Furthermore and likewise advantageously the milking installation comprises a milk transporter, in particular a milk transport vehicle, truck or further tanks and transport vessels, the air pressure equalisation openings of which are likewise connected to a sterile air filter installation. It is thus ensured that, from the extraction of the milk from the teat of a farm animal until final processing, for example as yoghurt, raw milk cheese, curd cheese, kefir or other dairy products, the food product solely comes into contact with a sterile air atmosphere, such that no unwanted contaminants or biological growth of microorganisms can proceed in the raw milk environment. An extremely long storage life of the raw milk is thus achieved without additional measures for extending storage life, such that for example it is possible to dispense with thermal treatment or ultra-heat treatment, irradiation by light or the addition of microbicidal agents. A milk transporter may preferably comprise a milk chiller which chills the raw milk to <5° C., such that a cold chain and an extended storage life may be achieved more rapidly. For instance, the raw milk may be chilled by direct evaporation of coolant or ice water or the raw milk may be chilled to low temperatures by blowing in chilled sterile air.

Environments for inward and outward ventilation of external air are provided in each case in the milk collection tank and milk transporter. In order to avoid contamination of the tank interior, the volume of air which is blown by the sterile air filter installation into the tank of the milk collection tank or the milk transporter is greater than a volume of air which can enter through inward or outward ventilation openings. Blowing sterile air at elevated atmospheric pressure into the collection or transport tank thus prevents contaminated ambient air from being able to enter into the tank from outside.

A final aspect proposes a method for use and for clean-in-place cleaning (CIP-cleaning) of a milking cluster according to one of the preceding claims which comprises the following steps:
  on completion of a milking process, switching off the fluid aspiration volumetric flow and the pulsation volumetric flow, such that a teat cup drops off a teat;
  switching at least the fluid aspiration volumetric flow ($V_m$) back on;
  introducing a teat to be milked and starting a further milking process or stopping the milking process.

The inventive method is distinguished in that a sterile air volumetric flow rate ($V_s$) which is greater than a fluid aspiration volumetric flow rate ($V_m$) is continuously supplied to the top region of the teat cup, such that a sterile air blanket is established at the teat accommodation opening which prevents ambient air from flowing into the teat cup. A method for use and a cleaning method are thus proposed in which sterile air is also passed through the teat cup of the milking cluster outside the milking process, such that no contamination can get from the outside into the raw milk system and thus the milk can be further processed directly from the udder without contact with atmospheric air. An extremely long storage life without additional storage life treatment measures is consequently achieved.

One advantageous further development proposes as an intermediate step that, once the milking process is complete, the teat accommodation opening is closed for cleaning purposes by a fluid-tight sealing stopper. Closing the teat accommodation opening on the one hand mechanically prevents contaminant substances from being able to enter the teat cup and on the other hand the teat cup is flushed with sterile air by a pressure build-up of sterile air, such that possible contaminants can be aspirated. As a consequence, improved CIP cleaning is achieved, such that it is possible to dispense with using chemical cleaning agents. Cleaning costs and downtime in the milking method are reduced as a consequence.

DRAWINGS

Further advantages are revealed by the present description of the drawings. The drawings show exemplary embodiments of the invention. The drawings, description and claims contain numerous features in combination. A person skilled in the art will expediently also consider the features individually and combine them into meaningful further combinations.

In the drawings:

FIG. 5 shows a representation of a method for use and CIP cleaning according to the invention;

Identical elements are denoted with the same reference signs in the figures. The figures merely show examples and should not be understood as being limiting. Individual features of the invention may also be combined with one another in order to provide further exemplary embodiments.

Figure 1:
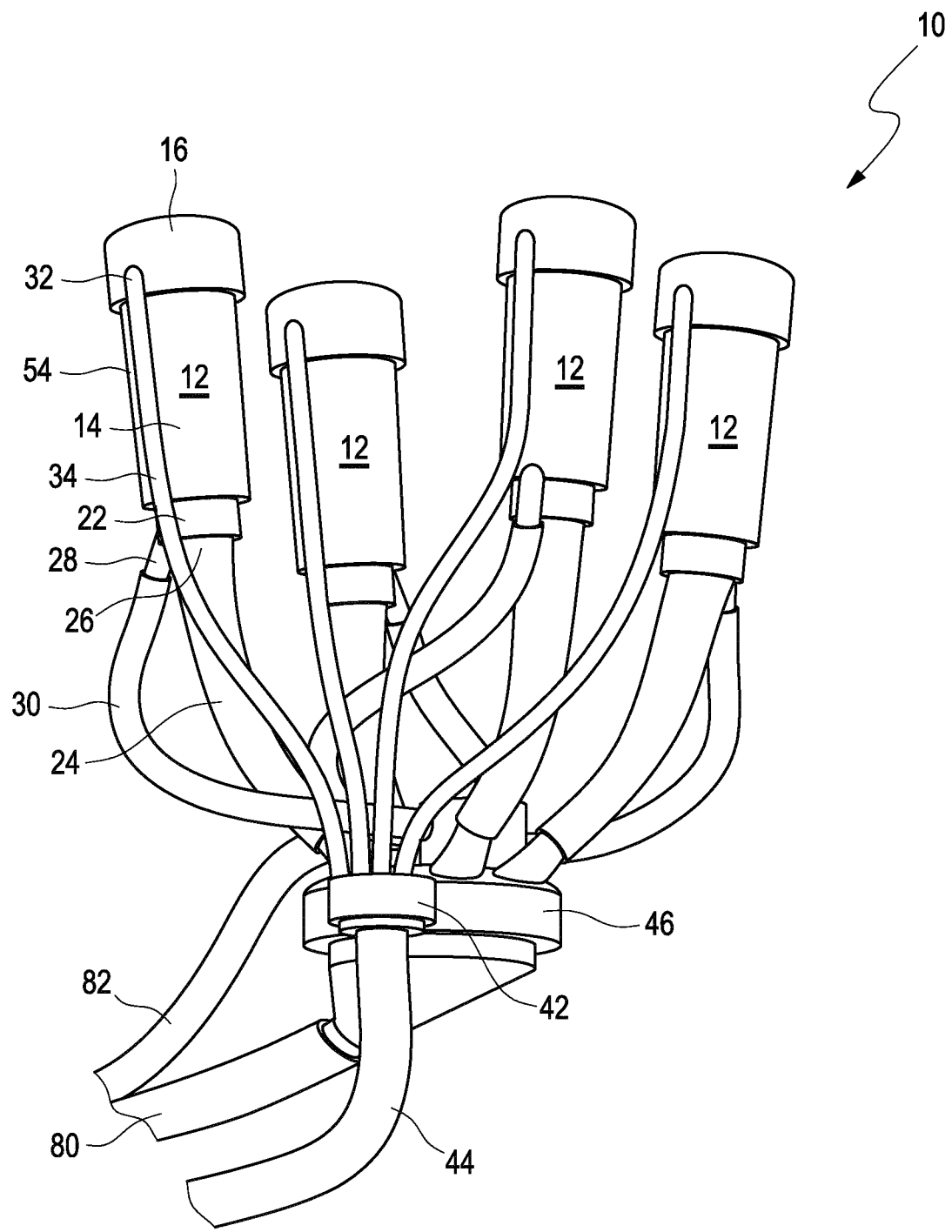
FIG. 1 shows a perspective representation of a milking cluster according to the invention.

FIG. 1 shows a perspective view of a first embodiment of a milking cluster 10 according to the invention. The milking cluster 10 comprises four teat cups 12 with a cup housing 14 of stainless steel and an inserted teat cup liner 16. A milk tube 24 which leads to a claw 46 is arranged at the cup bottom 22 of each teat cup 12. The four milk tubes 24 from the four teat cups 12 come together in the claw 46, wherein collected milk can be discharged via a central milk tube connection 80 to a milk collection tank (not shown). A pulsator connection 28, at which a pulsator line 30 opens into the cup housing 14, is furthermore arranged at the cup bottom 22. A pulsating vacuum can be generated in the cavity between the teat cup liner 16 and cup housing 14, whereby an inserted teat of an animal to be milked can be stimulated for milk release. The pulsator line 30 is likewise guided to the claw 46, wherein a central pulsator connection 82 to a central pulsator line is arranged in order to convey a pulsation reduced pressure to the teat cup. Each teat cup 12 comprises a sterile air pressure line 34 which is guided in a mouth portion 32 of the teat cup liner 16 into the top region of the teat cup 12. The sterile air pressure line 34 of each teat cup 12 is guided to a sterile air distributor unit 42 which is arranged on the claw 46. A central sterile air pressure line connection 44, which leads to a central sterile air pressure line via which sterile air can be conveyed into the top region of teat cup 12, opens at the sterile air distributor unit 42. The fluid flow rate of sterile air through each sterile air pressure line 34 exceeds the fluid flow rate at the milk tube 24, such that both in the milking state and in the intervening periods a sterile air overpressure prevails in the teat cup interior, such that a sterile air blanket is provided which prevents contaminants from being able to enter the interior of the teat cup 12 via atmospheric air. As a consequence, milked milk can be drawn from the udder of a farm animal and further processed without coming into contact with atmospheric air.

Figure 2:
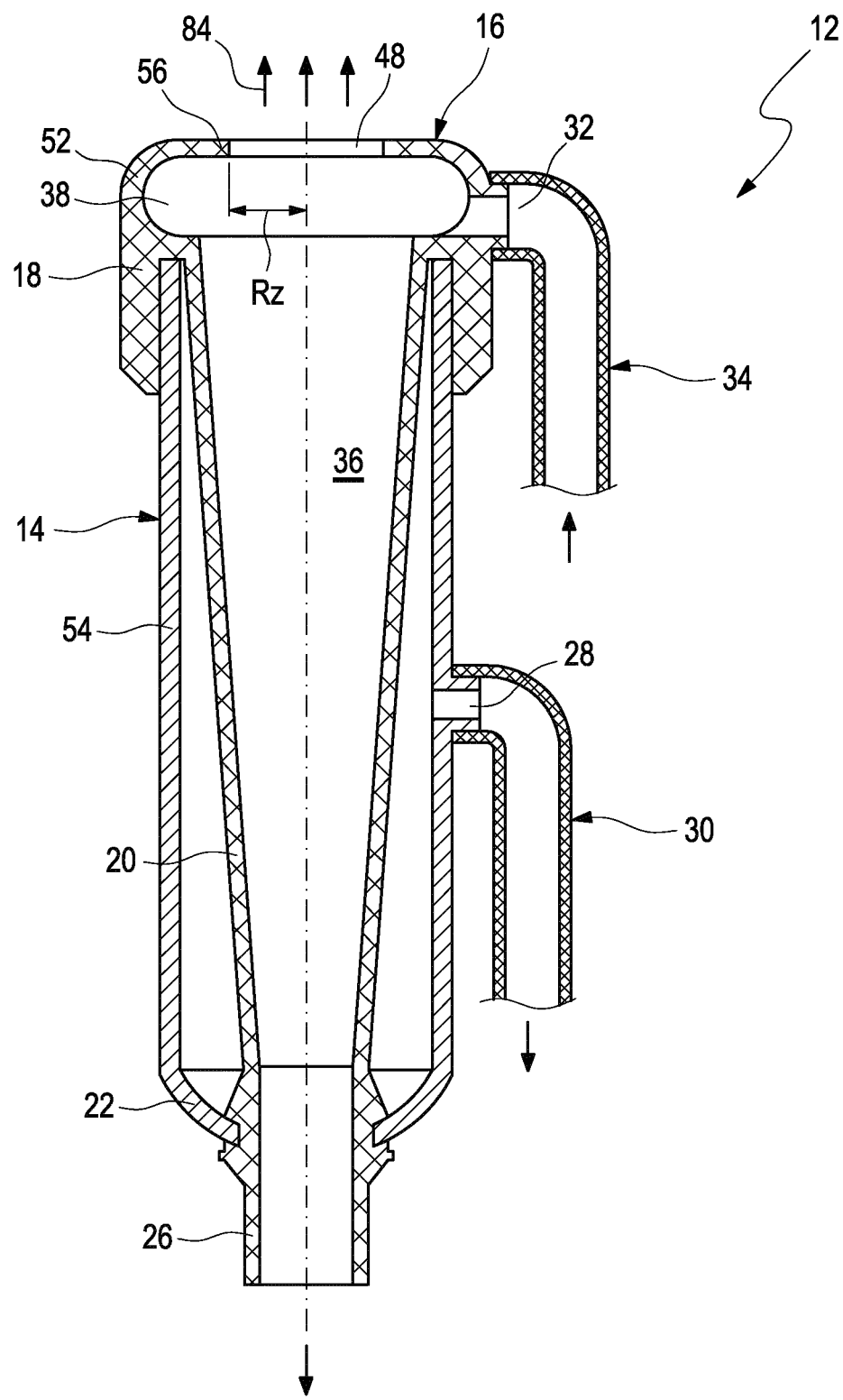
FIG. 2 shows a sectional representation of an embodiment of a teat cup according to the invention in a state ready for milking.

FIG. 2 shows a sectional diagram of a teat cup 12 according to one embodiment of the invention. The teat cup 12 comprises a cup housing 14 of stainless steel with a cup bottom 22. A teat cup liner 16, which encloses the upper open edge of the cup housing 14 and forms a top region 18, has been inserted into the cup housing 14. A suction region 20 of the teat cup liner tapers conically towards the milk tube connection 26, such that an udder which enters the teat accommodation region 36 hermetically seals the top region 18 of the suction region 20. A mouth portion 32 of a sterile air pressure line 34, through which sterile air is introduced into an annular chamber 38, is located in the top region 18. The upper teat accommodation opening 48 has a radius which is greater than the average radius of a teat which can be introduced into the teat accommodation region 36. The volumetric flow rate of sterile air through the sterile air pressure line 34 is greater than the fluid flow rate which is discharged through the milk tube connection 26, such that a sterile air blanket 84 is obtained, whereby flow of air from outside into the annular chamber 38 is prevented.

Figure 3:
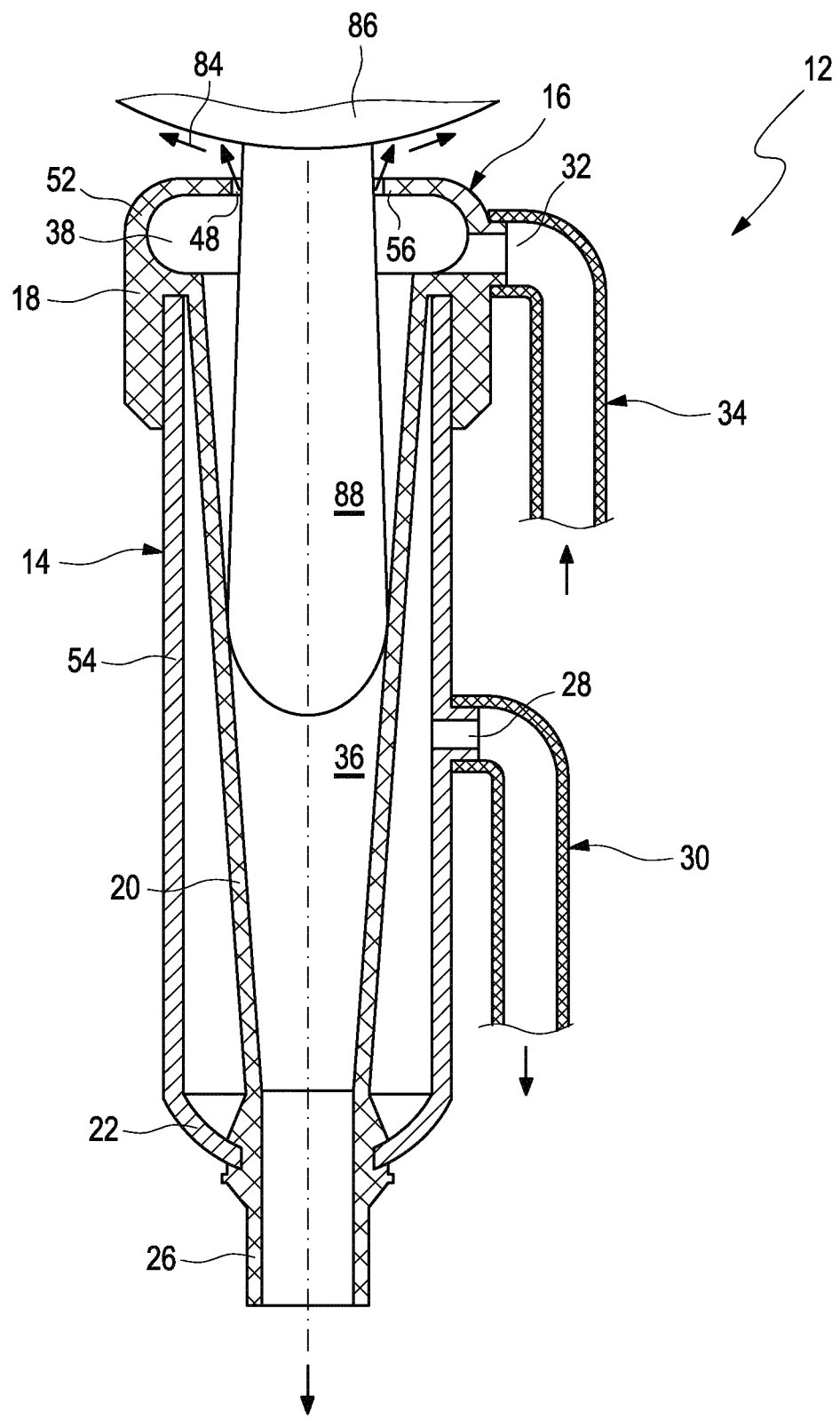
FIG. 3 shows a representation of the teat cup according to FIG. 2 in a milking state.

FIG. 3 shows the exemplary embodiment represented in FIG. 2 of a teat cup 12 with an inserted teat 88 of an udder 86. Thanks to the conical taper of the suction region 20, the teat 88 separates the top region 18 with annular chamber 38 from the suction region 20 from which milk is discharged through the milk tube connection 26. Because the pulsator line 30 generates a reduced pressure in the cavity between cup housing 14 and suction region 20 of the teat cup liner 16, the teat 88 is stimulated to release milk. The milked milk is conveyed away through the milk tube connection 26 by means of fluid flow. A sterile air overpressure arising in the annular chamber 38 is dissipated via the opening between teat 88 and teat accommodation opening 56 and serves on the one hand to cool the udder 86 while on the other hand preventing ingress of shed air.

Figure 4:
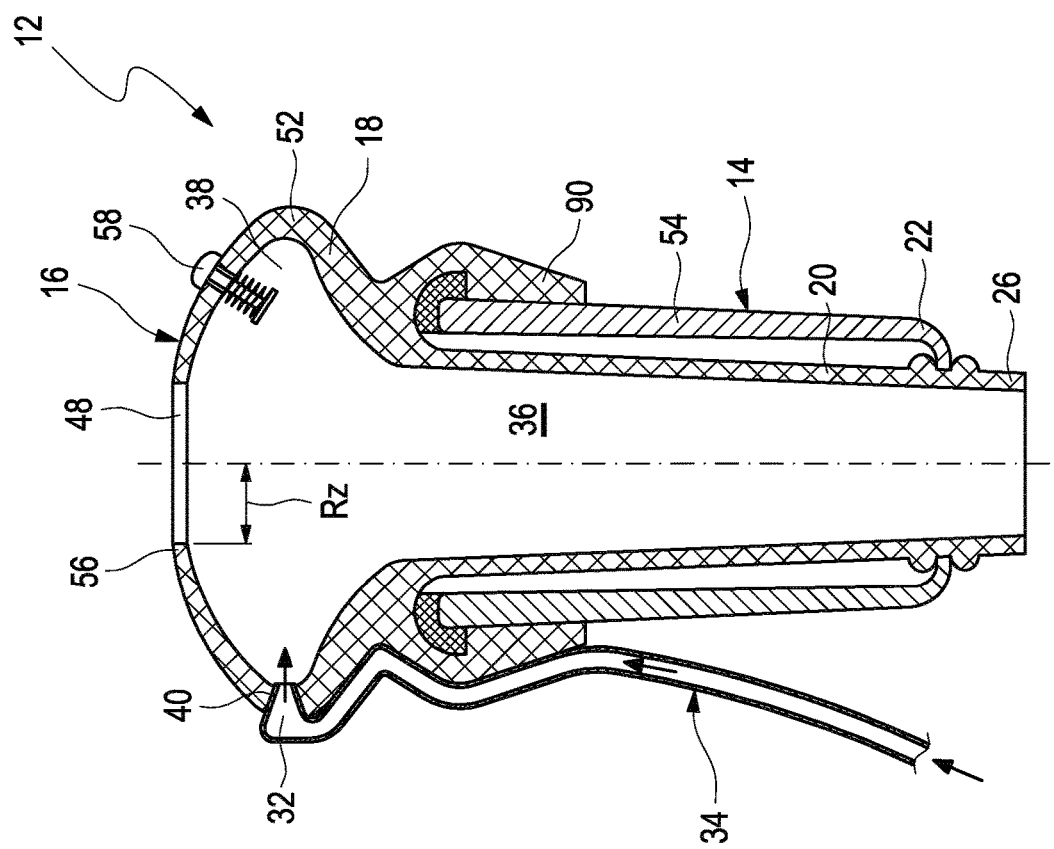
FIG. 4 shows further embodiments of a teat cup liner and of a teat cup according to the invention.
Figure 4:
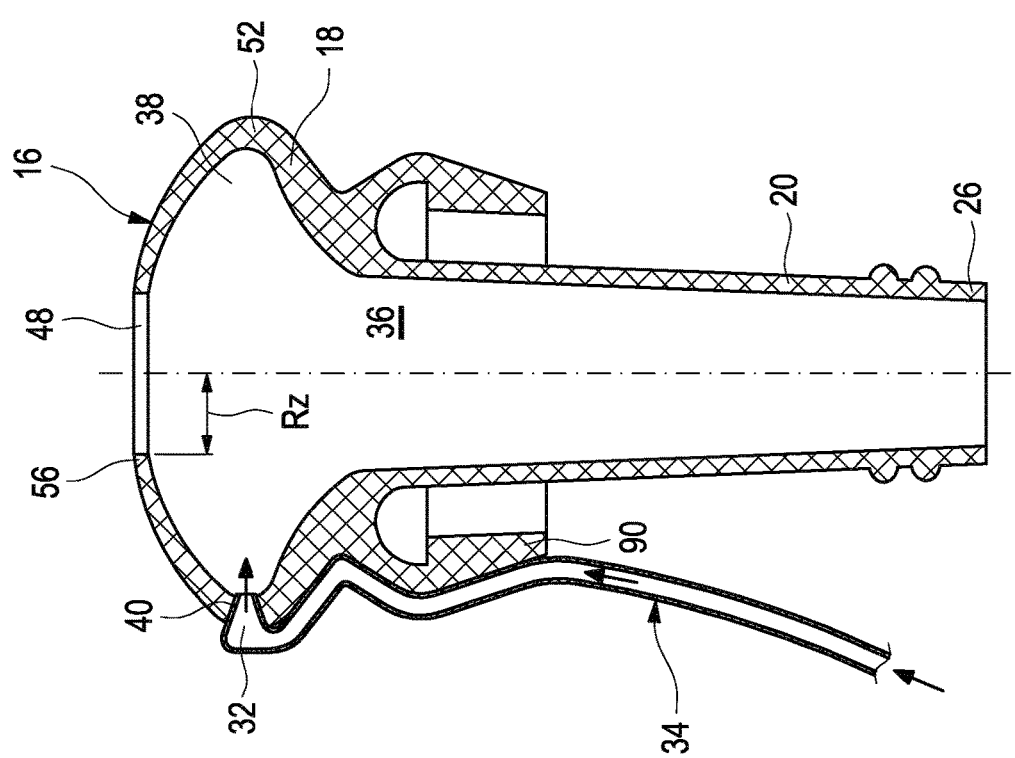

FIG. 4a shows a sectional representation of a teat cup liner 16 of one exemplary embodiment of the invention. The teat cup liner 16 is divided into a suction region 20, in which the teat accommodation region 36 is defined, and a top region 18, in which an annular chamber 38 is provided. A mouth portion 32 of a sterile air pressure line 34, through which sterile air is blown into the annular chamber 38, is located in a wall region 52 of the annular chamber 38. To this end, a compressed air nozzle 40 is provided at the mouth portion 32 which purposefully directs the sterile air flow towards the teat accommodation opening 48 in order to prevent ingress of shed air. The wall portion 56 which defines the teat accommodation opening 48 is moulded from a material which is resilient, such that a teat can readily be inserted, and an overpressure of sterile air which arises can escape in the space remaining between teat and wall portion 56. The teat cup liner 18 comprises a fold-over region 90 which can fold back over an upper edge of a cup housing 14.

FIG. 4b shows an inserted teat cup liner 16 according to FIG. 4a. At variance with FIG. 4a, a pressure relief valve 58 is arranged in the wall region 52 of the annular chamber 38 which is capable of dissipating an overpressure of sterile air which arises in order to prevent excessive pressure and thus unintended detachment of the teat cup 12 during the milking process. The sterile air pressure line 34 may be mounted, for example adhesively bonded, clamped with clamping means or arranged with fastening means such as overlay means, on an outer wall portion 54 of the cup housing 14, in order to permit simple handling of the milking cluster.

FIGS. 5a to 5d show a procedure for milking and CI P cleaning of a teat cup 12. The structure of the teat cup 12 corresponds to that of the exemplary embodiments shown FIGS. 2 and 3. In the first step, neither is an aspiration fluid flow applied to the milk tube connection 26, nor is a vacuum to the pulsator line 30. A sterile air supply is merely established in the sterile air pressure line 34 which is applied continuously in all the steps of the milking method and the cleaning method. In this state, sterile air passes outwards via the teat accommodation opening 56 and forms a sterile air blanket 84, and sterile air furthermore flows towards the milk tube connection 26. In order to flush the teat cup 12 with sterile air, a sealing stopper 50 can be placed on the teat accommodation opening 56, such that sterile air merely flows through the teat cup liner 16 and the teat accommodation region 36 and sterile air is blown into the system via the milk tube connection 26. When a milk pump is activated, fluid flows via the milk tube connection 26, wherein a pulsating vacuum may also simultaneously be applied to the pulsator line 30 in order to initiate a milking process while sterile air continues to be introduced via the sterile air pressure line 34. A teat 88 of an udder 86 is then introduced into the teat accommodation region 36 and a milking process can begin. In order to remove the teat cup 12, fluid flow at the milk tube connection 26 is interrupted and the overpressure generated by the sterile air supply automatically detaches the teat cup 12 from the teat 88. The overpressure of sterile air which arises flows past the teat via a residual gap towards the udder 86, cools the udder and prevents ingress of contaminants from the shed air.

Figure 6:
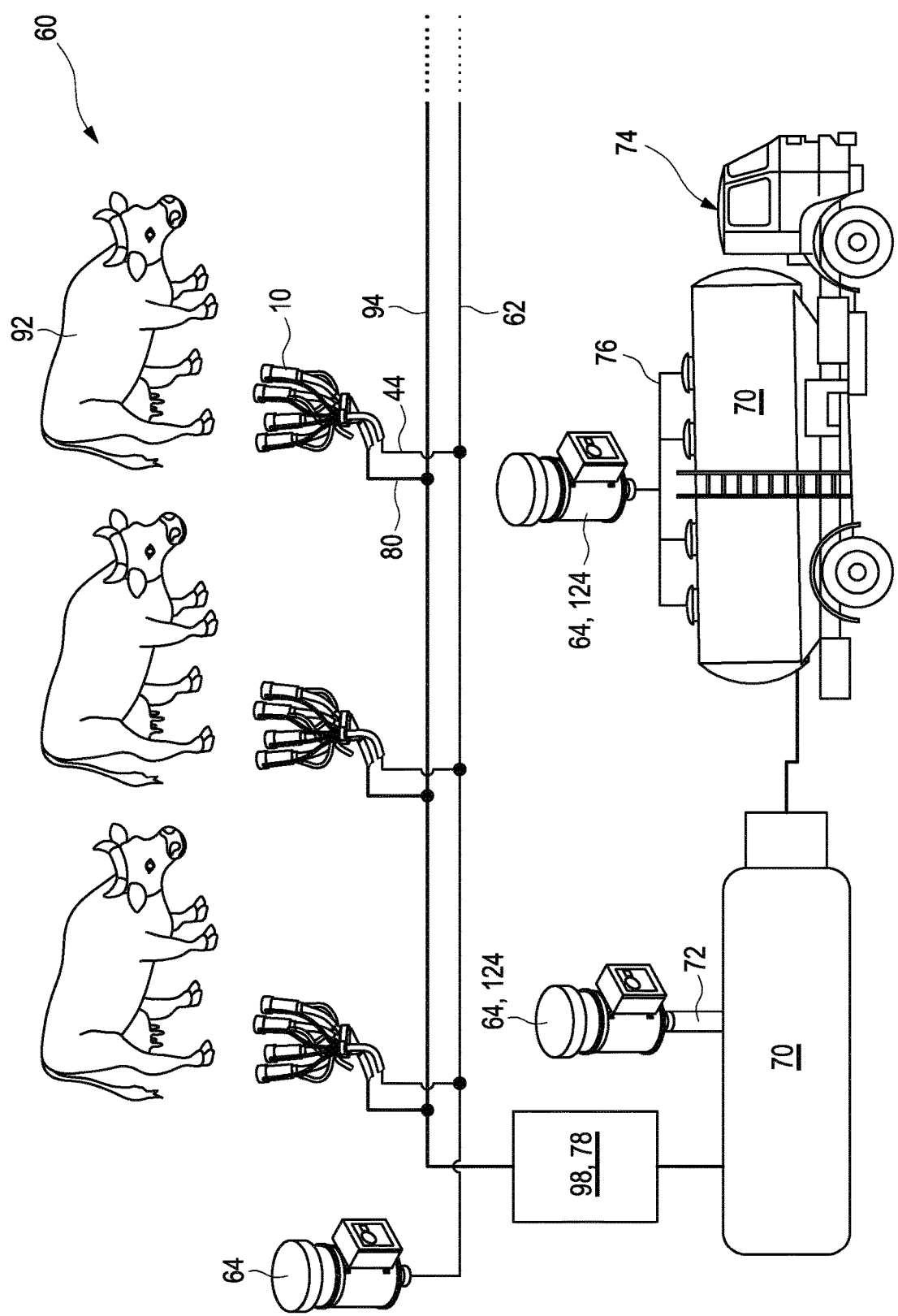
FIG. 6 shows a representation of an embodiment of a milking installation according to the invention.

FIG. 6 shows a schematic diagram of one embodiment of a milking installation 60 with which cows 92 are milked in parallel. The milking installation 60 comprises a central milk collection line 94 and a central sterile air pressure line 62. Central sterile air pressure line connections 44 of milking clusters 10 are connected to the central sterile air pressure line 62. Milk milked by the milking clusters 10 is transported via a central milk tube connection 80 to the central milk collection line 94. The milk in the central milk collection line 94 is conveyed via a milk pump apparatus 98 to a milk collection tank 70 which generally collects the milk chilled to a low temperature of approx. 2° C. to 5° C. To this end, the central milk collection line 94 may be guided through a continuous-flow milk chiller 78, which may operate in the manner of a heat exchanger, in order to chill the raw milk already in the central milk collection line 94 to a temperature of below 5° C. The central sterile air pressure line 62 is supplied with sterile air via a sterile air filter installation 64, wherein the volumetric flow rate of the sterile air is higher than the fluid flow rate which is discharged by the milk pumping apparatus 98 via the central milk collection line 94. As a consequence, a sterile air blanket is formed in each teat cup 12 of each milking cluster 10, such that no shed air can enter before the start of milking and during the milking process. The milk collection tank 70 comprises an air pressure equalisation opening 72 to which a separate sterile air filter installation 64 is connected such that, in the event of air pressure equalisation, for example during filling of the milk collection tank 70, during chilling of the milk collection tank 70 or during a cleaning operation, pressure equalisation can be provided by means of an exchange of sterile air. The sterile air filter installations 64 which are connected to the milk collection tank 70 and to the milk transporter 74 are combined with a milk chiller 124 in order to blow in sterile air at a temperature of <5° C. Alternatively, the milk chiller 124 may directly evaporate coolant or cool the raw milk by means of a heat exchanger. A milk transporter 74 in the form of a milk tanker truck is connected via a connecting line to the milk collection tank 70. The raw milk from the milk collection tank 70 can be taken for further processing in a dairy using the milk transporter 74. The milk transporter 74 likewise substantially comprises a milk collection tank 70 which has one or more air pressure equalisation openings 76. The air pressure equalisation openings 76 are likewise connected via a sterile air filter installation 64 of the milk transporter 74 for pressure equalisation with the outside world, such that for example after completion of a hot cleaning process or during chilling air can only be passed into the milk tank as sterile air filtered from the atmosphere. Using a milking installation as shown in FIG. 6, raw milk can be milked and transported without contamination with shed air or with ambient air, such that raw milk has an extremely long storage life and a long shelf life and high quality of the final product can be achieved without further processing steps.

Figure 7:
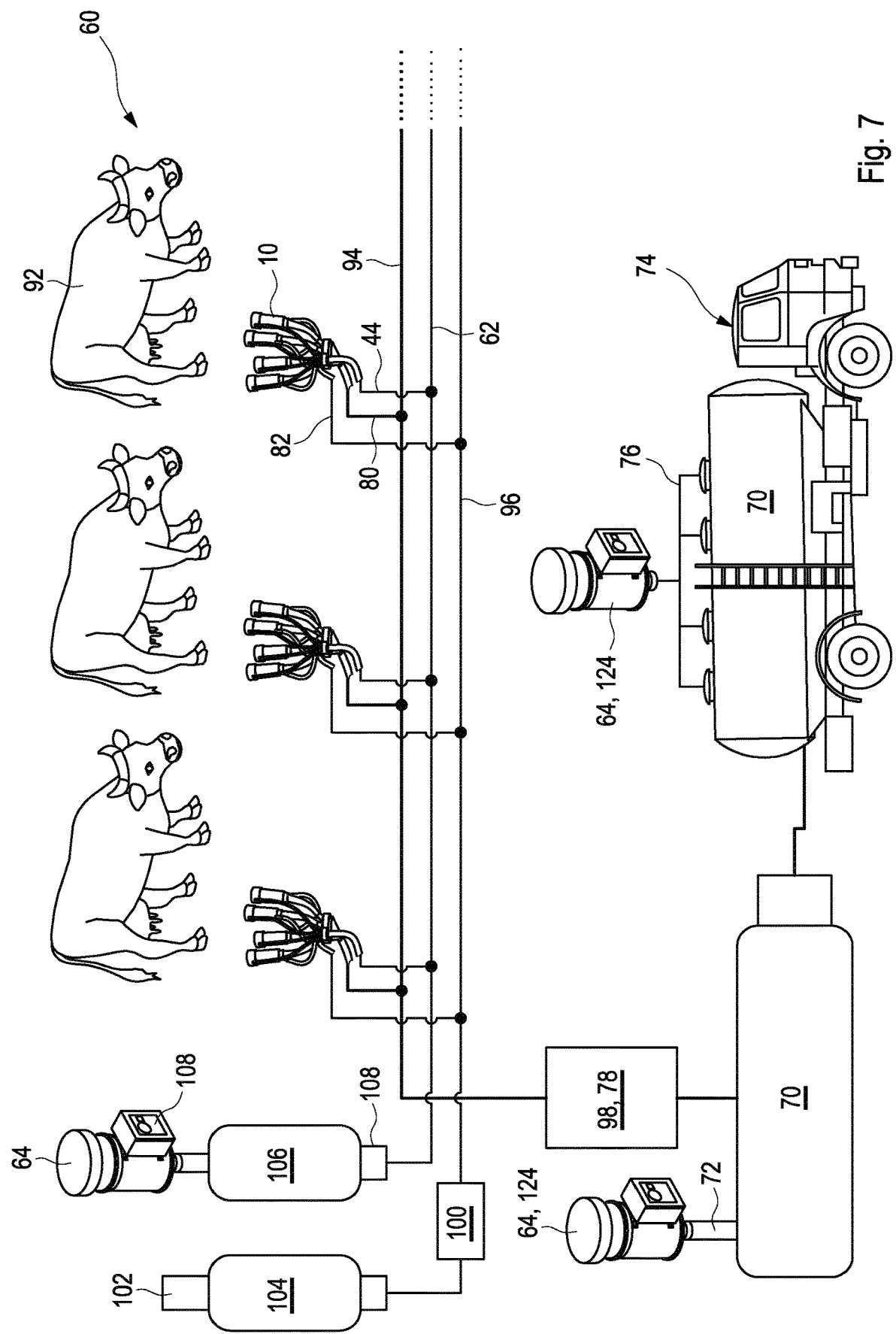
FIG. 7 shows a representation of a further embodiment of a milking installation according to the invention.

FIG. 7 shows an alternative embodiment of a milking installation 60. No description is here provided of the elements which have already been presented in FIG. 6, only the differences are discussed. In contrast with the milking installation shown in FIG. 6, the milking installation shown in FIG. 7 comprises a further central pulsation line 96. Milked raw milk is conveyed onwards from milking cluster 10 via a central milk tube connection 80 to the central milk collection line 94. Sterile air for producing a sterile air blanket is conveyed by a central sterile air pressure line 62 via a central sterile air pressure line connection 44 to the milking cluster 10. A pulsating vacuum or low pressure which is indispensable for the milking process is conveyed via the central pulsation line 96 and a central pulsator line connection 82 to the teat cup of each milking cluster 10. A vacuum pump 102 with a downstream vacuum tank 104 serves to generate the pulsation vacuum. A pulsation vacuum via which each teat cup of the milking cluster can provide a milking motion at the udder of an animal to be milked is generated in accordance with a milking stimulus by a pulsation controller 100. In order to produce the sterile air blanket, a sterile air filter installation 64 is arranged upstream of a sterile air compression tank 106. Sterile air is provided in compressed form in the sterile air compression tank 106, such that a large number of milking clusters can be connected to the central sterile air pressure line 62. A sterile air pressure controller 108 provides a volumetric flow rate and pressure in the central sterile air pressure line 62 which are sufficient to ensure that a sterile air blanket can be achieved at each milking cluster. Milk from the central milk collection line 94 is passed on via a milk pumping apparatus 98 to a milk collection tank 70. Air pressure can be equalised in the milk collection tank 70 via an air pressure equalisation opening 72 and a further sterile air filter installation 64. Finally, the raw milk can be transported away to a dairy by way of a milk transporter 74 which in each case also has a sterile air atmosphere in the milk tank. Thanks to the overall processing process in the proposed milking installation, contaminated air, pathogens, microbes or dust particles cannot enter the raw milk at any point, such that an extremely high quality and long life of untreated raw milk can be achieved. The sterile air filter installations 64 connected to the milk collection tank 70 and to the milk transporter 74 may be combined with a milk chiller 124 in order to blow chilled sterile air into the storage tanks. Alternatively, the raw milk can be chilled to a temperature of <5° C. by means of heat exchangers or in another manner in order further to increase the storage life of the raw milk.

Figure 8:
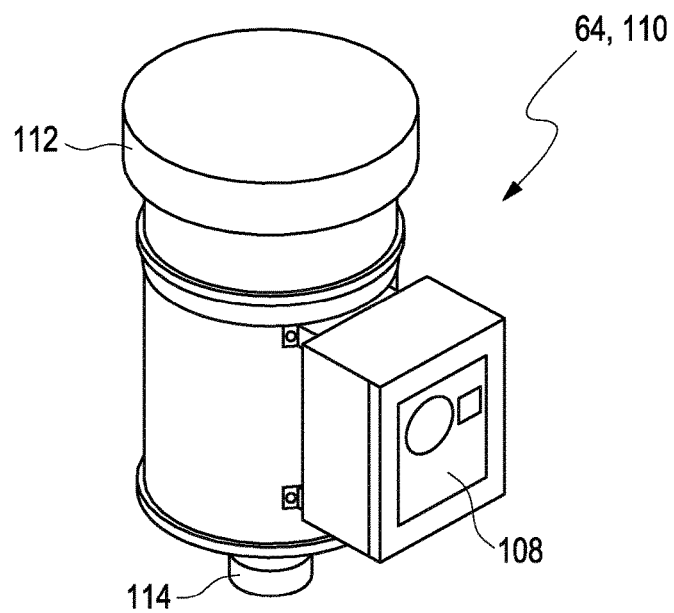
FIG. 8 shows a perspective representation of a sterile air filter installation for use in the invention.

FIG. 8 shows a perspective view of one embodiment of a sterile air filter installation 64 which takes the form of a sterile air compression/filter installation 110. The sterile air compression/filter installation 110 comprises an ambient air inlet region 112 with a labyrinth duct, into which air can flow only from below with protection from environmental influences and rain and, arranged at the opposite end, a sterile air outlet region 114 in which filtered sterile air is output. The filter installation 110 is of cylindrical construction and, on an outer wall portion, comprises an electrical sterile air pressure controller 108 in which are arranged operating elements and display elements for displaying the operating state and for example an upcoming filter change, current pressure etc.

Figure 9:
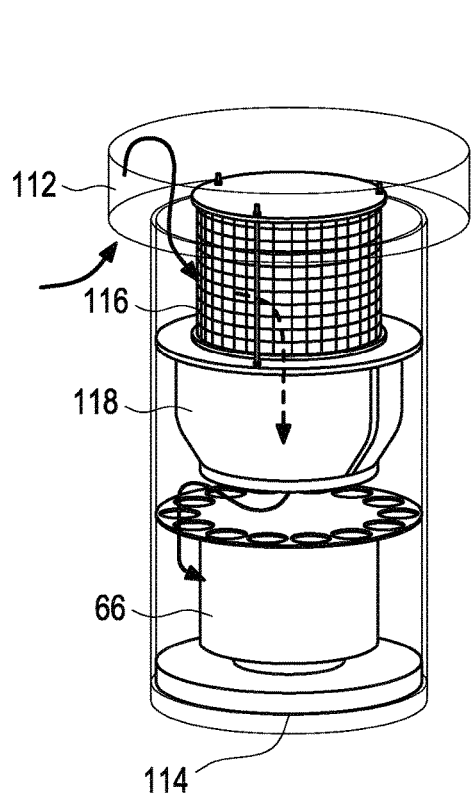
FIG. 9 shows a perspective representation and block circuit diagram of a sterile air filter installation for use according to the invention.
Figure 9:
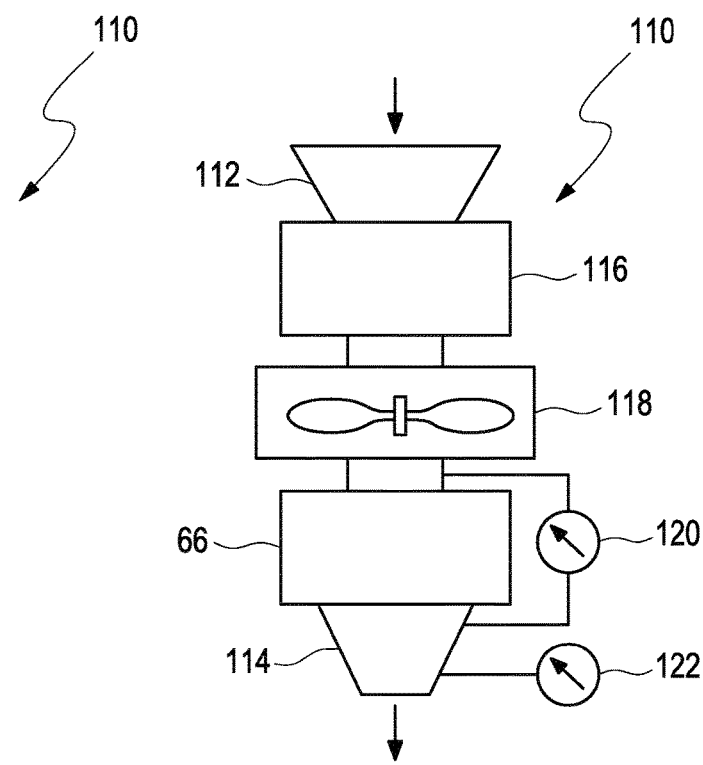

FIG. 9a shows a perspective view of the internal structure of the sterile air compression/filter installation 110 shown in FIG. 8, while FIG. 9b shows a schematic block circuit diagram of the air path and the electrical components of the sterile air compression/filter installation 110. Ambient air is conveyed via a labyrinth duct into an ambient air inlet region 112 and prefiltered through a prefilter unit 116. The prefilter unit can filter air flowing at a velocity of around 0.35 m/s and filters coarse substances out of the air. A filter fan 118 which generates an air pressure and serves to generate a desired fluid flow rate of sterile air is then arranged downstream. The filter fan 118 is speed-controllable and may have a nominal power output of between 100 W and 500 W, preferably 200 W, and provide an air throughput of up to 500 m³/h. A differential manometer 120 which is capable of detecting a pressure difference of the fine filter unit 66 is arranged at the outlet of the filter fan 118. The sterile filter unit 66 is a class 100 filter which allows no more than 100 particles of a size of 0.5 µm to pass through per m³ air and which has a solids separation rate of 99.997%. It preferably takes the form of a class H14 or higher HEPA filter or ULPA filter. It has an active filter area of at least 5 m², wherein the differential manometer 120 measures the pressure drop across the filter 66 and so indicates a degree of contamination or defective or proper functioning of the filter installation. Finally, a further manometer 122 capable of determining the sterile air pressure within the central sterile air pressure line 62 is arranged at the sterile air outlet region 114 in order to permit monitoring of an adequate sterile air blanket.

It is conceivable to provide a milk chiller 124 which operates as a heat exchanger or in the same manner as a compression air conditioning unit in the sterile air compression/filter installation 110 in order to produce sterile air with a temperature of <5° C. By blowing in chilled sterile air, it is possible to ensure not only right from the milking cluster 10 but also in a milk collection tank 70 and/or milk transporter 74 that the raw milk can be chilled and thus further processed with an extended storage life.

Thanks to the sterile air blanket according to the invention over the raw milk, it is possible to achieve up to 10% higher yields of yoghurt and cottage cheese combined with a considerable improvement in quality and extension of storage life. Wet cleaning collection tanks generally involves cleaning the tank interior with alkalies or acids at over 70° C. and then rinsing with cold water and this gives rise to considerable air exchange due to the temperature fluctuations, wherein by supplying sterile air it is possible to prevent ingress of pathogens and contaminants into the region which is brought into contact with the raw milk. Purity and consistency of the raw milk are thus achieved and there is no need to introduce artificial substances or carry out treatment steps to extend storage life. For application according to the invention, the sterile air filter installation should be capable of generating a sterile air throughput of at least 500 m³/h.

The invention may moreover furthermore be used in the further processing of the raw milk obtained into finished products, such as for example cottage cheese, cream cheese, fresh curd cheese, granular curd cheese, granular cheese etc., by using an overpressure of sterile air instead of atmospheric air at every processing step which requires an exchange with atmospheric air, so as to prevent any leakage flow and ingress of contaminated air from outside into the processing process.

LIST OF REFERENCE NUMERALS

10 Milking cluster
12 Teat cup
14 Cup housing
16 Teat cup liner
18 Top region
20 Suction region
22 Cup bottom
24 Milk tube
26 Milk tube connection
28 Pulsator connection
30 Pulsator line
32 Mouth portion of sterile air pressure line
34 Sterile air pressure line
36 Teat accommodation region
38 Annular chamber
40 Compressed air nozzle
42 Sterile air distributor unit
44 Central sterile air pressure line connection
46 Claw
48 Teat accommodation opening
50 Sealing stopper
52 Annular chamber wall region
54 Cup housing outer wall portion
56 Wall portion surrounding teat accommodation opening
58 Pressure relief valve
60 Milking installation
62 Central sterile air pressure line
64 Sterile air filter installation
66 Filter unit
68 Sterile air compressor unit
70 Milk collection tank
72 Air pressure equalisation opening
74 Milk transporter
76 Air pressure equalisation opening 78 Continuous-flow milk chiller
82 Central pulsator line connection
84 Sterile air blanket
86 Udder
88 Teat
90 Fold-over region of teat cup liner
92 Cow
94 Central milk collection line
96 Central pulsation line
98 Milk pumping apparatus
100 Pulsation controller
102 Vacuum pump
104 Vacuum tank
106 Sterile air compression tank
108 Sterile air pressure controller
110 Sterile air compression/filter installation
112 Ambient air inlet region
114 Sterile air outlet region
116 Prefilter unit
118 Filter fan
120 Differential manometer
122 Manometer
124 Milk chiller

The invention claimed is:

1. A milking installation comprising at least one milking cluster with four teat cups, wherein each teat cup comprises a cup housing and, accommodated in the cup housing, a teat cup liner with a top region and a suction region, wherein a connection for a milk tube is arranged at the cup bottom or at an end of the suction region of the teat cup liner, and a connection for a pulsator line is arranged on a wall or bottom portion of the cup housing, and a mouth portion of a sterile air pressure line is arranged in the top region of the teat cup liner, through which pressure line sterile air is introduced at a volumetric flow rate greater than a fluid aspiration volumetric flow rate at the milk tube, such that a sterile air blanket is established in the top region of the teat cup liner, wherein at least one central sterile air pressure line with at least one sterile air filter installation is included, by which each sterile air pressure line of the milking cluster is centrally supplied with sterile air, such that the sterile air volumetric flow rate is established in each sterile air pressure line which is higher than the fluid aspiration volumetric flow rate in each milk tube, whereby the sterile air blanket is established in each teat cup.

2. The milking installation according to claim 1, wherein the sterile air filter installation comprises an EPA/HEPA or ULPA filter unit with a filter of class H13 or higher and wherein the sterile air filter installation comprises a controllable sterile air compressor unit.

3. The milking installation according to claim 1, wherein the sterile air volumetric flow rate is established such that an atmospheric overpressure of sterile air of at least 5 kPa is established in an annular chamber of the teat cup of the milking cluster in order to produce the sterile air blanket.

4. The milking installation according to claim 1, wherein a central milk collection line is included to which the milk tube of each milking cluster is connected and which central milk collection line is guided through a continuous-flow milk chiller which chills the raw milk to <5° C.

5. The milking installation according to claim 1, wherein a milk collection tank is included, an air pressure equalisation opening of which is connected to a sterile air filter installation, wherein a milk chiller which chills the raw milk to <5° C. is included in the milk collection tank.

6. The milking installation according to claim 1, wherein a milk transporter is included, an air pressure equalisation opening of which is connected to a sterile air filter installation, wherein a milk chiller which chills the raw milk to <5° C. is included in the milk transporter.

7. The milking installation according to claim 1, wherein an annular teat accommodation region with a teat accommodation opening is formed as an annular chamber at the top region of the teat cup liner of the milking cluster, and the mouth portion is arranged on a wall region of the annular chamber.

8. The milking installation according to claim 1, wherein the suction region of the teat cup liner of the milking cluster tapers conically at least in regions starting from the top region and towards the milk tube connection.

9. The milking installation according to claim 1, wherein the mouth portion of the milking cluster comprises a nozzle for oriented sterile air guidance towards a teat accommodation opening.

10. The milking installation according to claim 1, wherein the sterile air pressure line of the milking cluster is guided and fastened to an outer wall portion of the cup housing or is integrated in the outer wall portion.

11. The milking installation according to claim 1, wherein a sterile air distributor unit of the milking cluster with a central sterile air pressure line connection is arranged on a claw, from which a sterile air pressure line branches off to each teat cup.

12. The milking installation according to claim 1, the teat cup liner comprising the top region and the suction region, wherein the mouth portion for a sterile air pressure line is arranged at the top region of the teat cup liner of the milking cluster, wherein the top region comprises an annular teat accommodation region as an annular chamber, on a wall of which the mouth portion is arranged, and wherein the suction region tapers conically at least in portions starting from the top region.

13. The milking installation with a teat cup liner according to claim 12, wherein a pressure relief valve is arranged in a wall portion of the annular chamber or wherein a wall portion of the annular chamber surrounding a teat accommodation opening has a resilience such that, when a teat is inserted, a pressure relief valve function is provided, or wherein a radius of the teat accommodation opening is greater than an average teat radius.

14. A method for use and clean-in-place cleaning (CIP-cleaning) of a milking cluster of a milking installation according to claim 1, comprising the steps of:
on completion of a milking process, switching off a fluid aspiration volumetric flow and a pulsation volumetric flow, such that a teat cup drops off a teat;
switching at least the fluid aspiration volumetric flow back on;
introducing a teat to be milked and starting a further milking process;
wherein a sterile air volumetric flow which is greater than the fluid aspiration volumetric flow is continuously supplied to a top region of the teat cup, such that a sterile air blanket is established at a teat accommodation opening.

15. The method according to claim 14, further comprising an intermediate step that, once the milking process is complete, the teat accommodation opening of the milking cluster is closed for cleaning by a fluid-tight sealing stopper.

* * * * *